Jan. 1, 1935. C. G. MAXWELL 1,986,781
TOBACCO STEMMING MACHINE
Filed April 7, 1932 6 Sheets-Sheet 3

Inventor
CHARLES G. MAXWELL

Attorney

Inventor
CHARLES G. MAXWELL
By
Attorney

Patented Jan. 1, 1935

1,986,781

UNITED STATES PATENT OFFICE 1,986,781

TOBACCO STEMMING MACHINE

Charles G. Maxwell, Louisville, Ky., assignor, by mesne assignments, to American Machine & Foundry Company, New York, N. Y., a corporation of New Jersey Application April 7, 1932, Serial No. 603,871.

32 Claims. (Cl. 131—57)

My present invention relates to tobacco stemming machines and has for its various objects, among others, to provide a machine of unusually large capacity; one wherein there will be relatively few so-called "drops" or unstripped leaves; wherein the stripped leaf portions will be of large size, and wherein the stems will be thoroughly cleaned of their lamina.

I am aware of the fact that a large number of patents have been granted for tobacco stemming machines, but for various reasons only a very few of them have ever been used commercially. Perhaps the most important reason for this is because of their limited capacity, although other important reasons are because of the excessive number of so-called "drops"; because of their failure to satisfactorily strip all the membrane from the stems, and because the membrane was cut, torn or thrashed into relatively small fragments, thus producing a large amount of undesirable "scrap".

One reason for the large percentage of "drop" leaves in other machines is the failure of the stem-gripping means to properly grasp and hold the leaf stems while the stemming mechanism is operating to remove the membrane therefrom. This failure on the part of the stem-gripping means is due largely to the fact that the diameter or thickness of different leaf-stems vary greatly at their "butt" ends, and where rigid gripping elements such as opposed chain-links or other types of co-operating gripping jaws are employed to grip more than a single stem at the same time it will be apparent that of the several leaves gripped between such links or jaws those of small diameter lying alongside those of larger diameter will be insufficiently gripped or not gripped at all, and when the stripping mechanism is of that type wherein there is a relative pulling movement between the leaves and the stripping means, the ungripped leaves will be released and pass through or fall out of the machine without being stripped. This results in so-called "drops" which must be collected and subsequently stemmed either by hand or otherwise thereby increasing the cost of the stemming operation.

One of the important features of the present invention resides in the provision of novel stem-butt gripping and advancing cables that will positively grip and hold a succession of advancing leaf-butts and wherein every leaf or a plurality of adjacent leaves will be securely held irrespective of the diameter or thickness of the leaf-butts, thereby preventing "drops" due to a failure on the part of the gripping mechanism to securely grasp and hold the leaves.

Another important feature of the invention resides in a novel construction and arrangement of stemming mechanism associated with the stem-butt gripping and advancing cables, said mechanism being arranged to advance or travel with the leaves as they are being stemmed and wherein the stems of the leaves are progressively withdrawn from the membranous portions while the leaves are traveling sidewise. In other words the stem is stripped from the leaf by being pulled therefrom while the membrane is held back by a pair of opposed endless strippers which advance with the leaves, but which do not contact with each other in their travel path, but provide a long slot too narrow to permit the leaf membrane to pass through, but through which the stem may be pulled while the leaves are advancing. This plan of operation is distinguished from that of machines which beat the laminæ of the leaf from the stem by a series of blows delivered by flattened blades or the like while the stem is held.

In the machine of the present invention the stem-butt gripping means and the stemming mechanism travel along diverging paths at substantially the same speed during the stemming operation and the stems are withdrawn or pulled from the leaves progressively but quickly during their travel.

Another feature of the invention resides in the employment of a novel stem-butt cleaner which may be arranged at any suitable place in the machine to clean the laminæ from the stem-butts and without unduly cutting the same into fine fragments. In the present embodiment I have shown the "butt" cleaner as located in advance of the main stemming mechanism, but it may be otherwise located or for that matter it may be dispensed with entirely, or it may be employed as a separate unit to clean the butts either before the leaves are fed into the machine, or as a final operation after the leaves have been stemmed.

As an illustration of the capacity of the present machine as compared with existing machines of the types now in general use, it may be stated that with my machine I have stemmed more than 20,000 pounds of tobacco in a working day of 8 hours, and with comparatively few "drops"; whereas present existing machines have a capacity of less than 3000 pounds per working day with a large percentage of "drops".

Briefly and generally stated the machine includes means for advancing a succession of leaves, endless means for simultaneously gripping the "butt" ends of a plurality of leaves and transporting them along a given path, and endless stemming means movable in a line or path divergent to the path of movement of the gripping means and through which the leaf stems are pulled as the leaves are advancing sidewise.

While I have shown my improved, stem-butt gripping means associated with a particular construction of stemming mechanism, I do not wish to be understood as limiting myself to this arrangement as obviously the gripping means may be employed in association with other types of stemming mechanism without departing from the spirit of the invention.

The machine also includes other more or less important features all of which will be hereinafter described in detail.

In order to enable others skilled in the art to understand, construct and use my said invention, I will now proceed to describe the same in connection with the accompanying drawings, wherein—

In the operation of the machine the tobacco leaves are placed upon horizontally-moving feed belts with the butt ends of the leaves alined against a vertical stop or abutment. The individual leaves or a succession of leaves will be fed forward sidewise by the feed belts to a second feeding mechanism consisting of opposed belts or cables, which second feed mechanism travels at a considerably greater speed than the feed-belts, so that as the individual leaves move from the feed belts to the second feed mechanism, they are more or less separated or spaced one from the other, to permit the butting mechanism to clean the stem butts as the leaves are carried forward by the second feed mechanism. From the latter feed mechanism the leaves are then carried into the range of action of the stemming mechanism, by means of stem-butt gripping and advancing mechanism, which in the instance shown, comprises traction members consisting of two sets of opposed endless cables having confronting convex portions which firmly grip and flex the stem butts transversely, and as the cables and the endless stemming mechanism are mounted to travel in diverging paths, but at the same speed, the stems are gradually but quickly pulled from the leaves during such advance. The stem-butt gripping and advancing cables and the stemming mechanism travel at like speeds, but at a speed greater than the speed of the feeding mechanism which feeds the leaves thereto, and this serves as a further means for separating or spreading the adjacent leaves as they are successively fed to the stemming mechanism thereby avoiding overloading or clogging.

While I do not wish to be understood as limiting myself to any particular speeds of travel of the various feeding or advancing mechanisms described, I may state that I have been able with my machine to stem more than 20,000 pounds of tobacco in a working day of eight hours, by running the first feed belts at a speed of 45 feet per minute, the second feed mechanism at 160 feet per minute, and the stem-butt gripping and advancing and the endless stemming mechanism at a speed of 280 feet per minute.

I have discovered from actual tests that cleaner stems and a greater output is obtained by operating the stem-butt gripping and advancing means and the endless stemming mechanism at a relatively high speed, and I have successfully stemmed a greater quantity of tobacco than that stated above, by increasing the speeds of the various feed and stemming mechanisms described.

The machine as illustrated comprises a frame consisting of two side frame members 1, with suitable transverse braces 2, arranged at appropriate points between the side frame members. The leaves are fed into the machine by means of feed belts 3 passing over a long feed table 4 (see Figs. 1 and 2), which table has an upstanding plate or abutment 5 at one side thereof, against which the butt ends of the leaves may be alined. The table 4 and feed belts 3 are of sufficient length to accommodate an adequate number of operators to feed the required amount of tobacco to maintain a continuous supply of leaves to the machine. The feed belts 3 pass over pulleys 6 mounted upon a shaft 7, which is driven by any suitable means.

The feed belts 3 advance the leaves successively to and between the opposed runs of a plurality of endless feed cables 8 and 9, which engage and grip the leaves transversely intermediate their ends, as indicated at stage 1, Fig. 16, to advance the leaves toward the stemming mechanism and within the range of action of the butt cleaning means as will be hereinafter described. I prefer to employ cables composed of flexible metal strands because their outer surfaces are somewhat rough or irregular, due to the individual strand formation and they therefore more firmly grip and hold the leaves and leaf stems against movements when subjected to a pulling strain as is the case when the stems are pulled from the leaves.

In the present embodiment of the invention I have shown the leaf advancing means as consisting of two upper and lower sets of endless metal cables as shown in Figs. 2, 3, 6, 17 and 19. In the instance shown I employ two spaced apart endless cables 8 in the upper set, and three spaced apart cables 9 in the lower set, but I do not wish to be understood as limiting myself to any specific number of cables in each set, as obviously a greater or less number may be employed.

Figures 3, 4, 5:
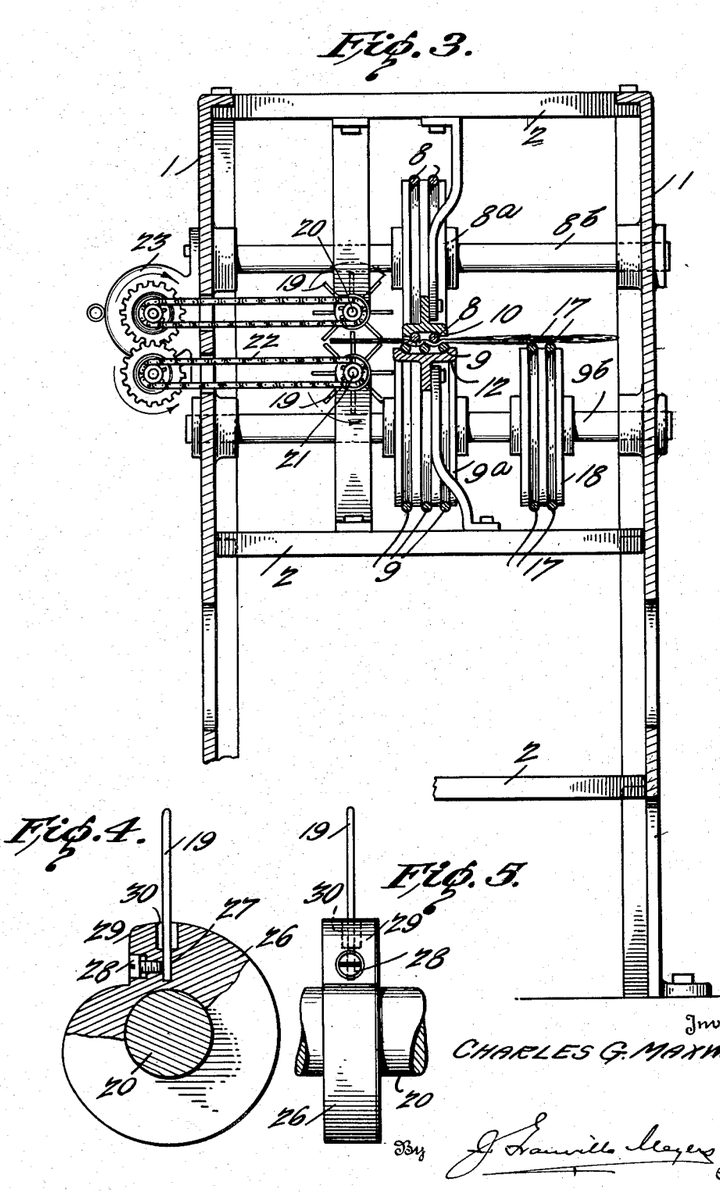
Fig. 3 is a vertical transverse section taken on line 3—3 of Fig. 1.
Figs. 4 and 5 are detail views of elements of the butt-cleaning wires and their mountings.
Figures 6, 7, 8:
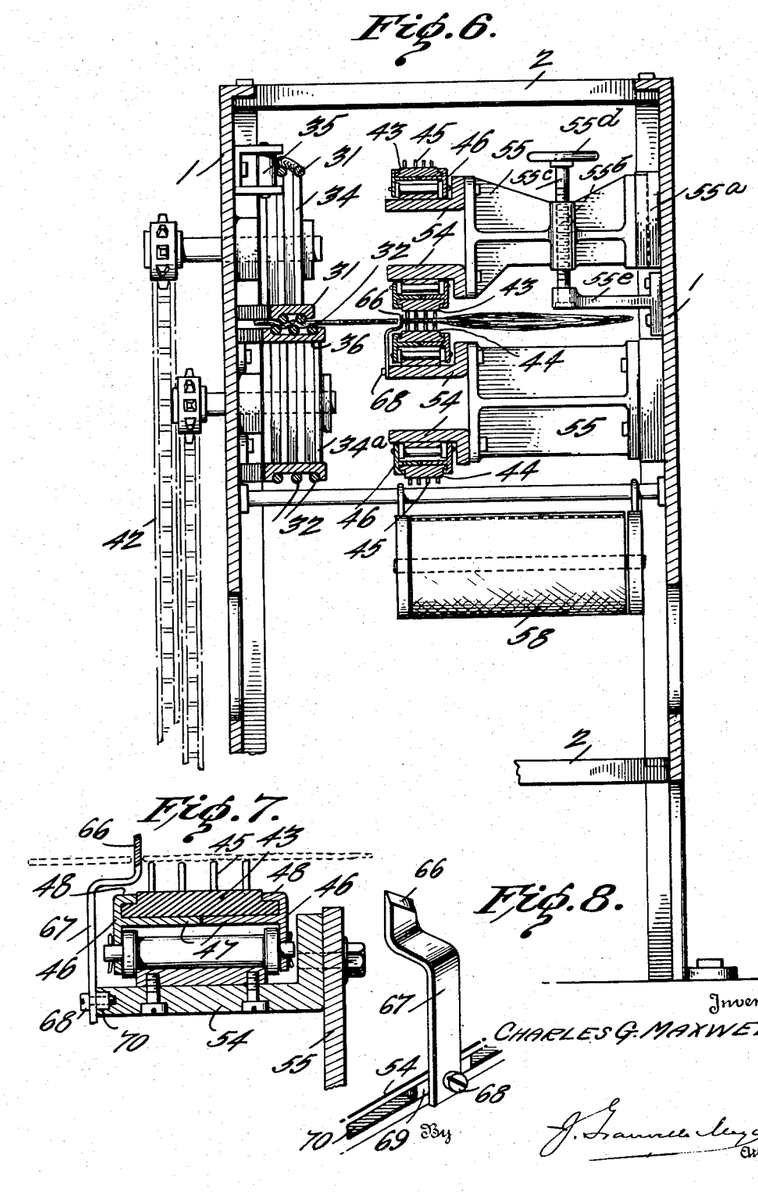
Fig. 6 is a vertical transverse section taken on the line 6—6 of Fig. 1.
Fig. 7 is an enlarged transverse section of a portion of the stemming mechanism.
Fig. 8 is a perspective view of the stem-cutting knife and its mounting.

By referring to Figs. 3 and 6, it will be seen that portions of the individual cables of the two sets are arranged to travel in parallel paths but are staggered or offset laterally relative to each other so that the two upper cables 8, will lie above and opposite the spaces between the three lower cables 9. If therefore a leaf, leaf-stem or stem-butt is advanced sidewise between the two sets of cables, it will be bent, creased or crimped transversely at spaced points as more clearly shown in Fig. 6, and therefore securely gripped and held sufficiently tight to withstand any pulling strain to which it may be subjected by the action of the stemming mechanism.

The cables 8 are trained over grooved pulleys 8ª, each mounted upon a shaft 8ᵇ, and the cables 9 are trained over correspondingly grooved pulleys 9ª, each mounted upon a shaft 9ᵇ, and the adjacent parallel runs of the two separate cables are maintained in substantial parallelism by means of upper and lower channeled guides 10 and 12, through which the respective sets of cables travel.

Figure 2:
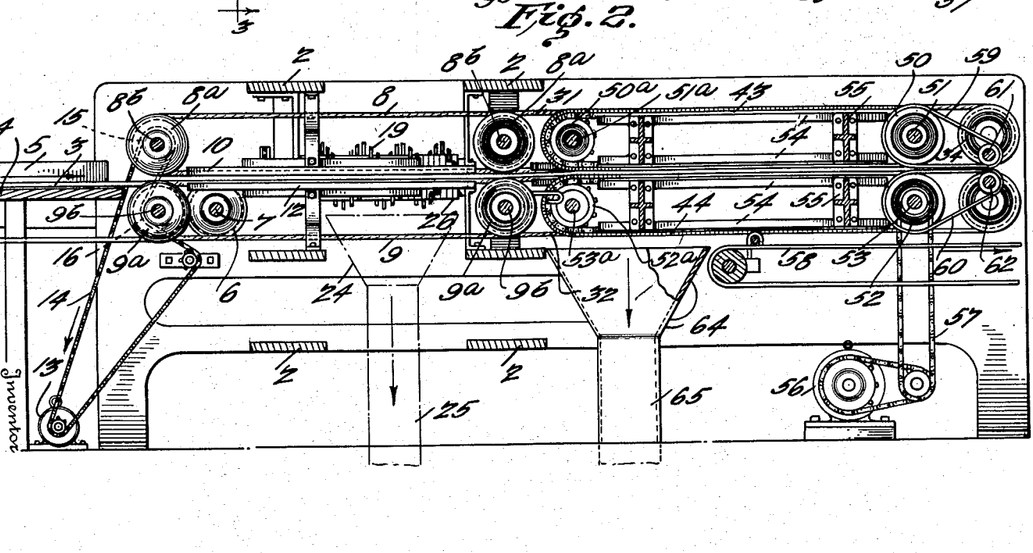
Fig. 2 is a longitudinal section taken on line 2—2 of Fig. 1.

One of the pulleys 8ª or 9ª, may be driven in the direction of the arrows, Fig. 2, from any suitable source of power, as by means of the electric motor 13, and sprocket chain 14, which is trained over sprockets 15 and 16, carried by the pulley shafts 8ᵇ and 9ᵇ, as more clearly shown in Fig. 2. By this arrangement and since the pulleys 8ª and 9ª are driven at a greater speed than the speed of travel of the feed belts 3, it will be seen that as the leaves are successively advanced between the parallel runs of the cables 8 and 9, at the feed end of the machine, they will be successively spaced apart a greater distance than the spacing they occupied when lying upon the feed belts 3.

The cables 8 and 9 are so arranged with relation to the feed belts 3, and the leaves lying thereon, that said cables will engage and clamp the leaves intermediate their ends, but preferably at a point nearer the butt ends of the leaves, so that they will be properly and securely supported and held during the action of the butt-cleaning devices, which will be presently described.

It has been found desirable, especially when long leaves are being acted upon, to support the tip ends of the leaves as they are advanced, and to accomplish this I have provided an additional set of endless cables 17, which are trained over grooved pulley 18 mounted upon the shafts 9ᵇ. As the upper run of these cables is located in substantially the plane of the upper run of the cables 9, it will be apparent that any portions of the leaf which extend beyond the portions that are gripped between the cables 8 and 9, will be supported by these additional cables 17, and thus prevented from dropping or hanging down during their advance. There is only one set of these additional cables 17, and as it is not necessary that the leaves be gripped at this point, it is obvious that a flexible canvas or leather belt could be substituted for the cables.

Figure 1:
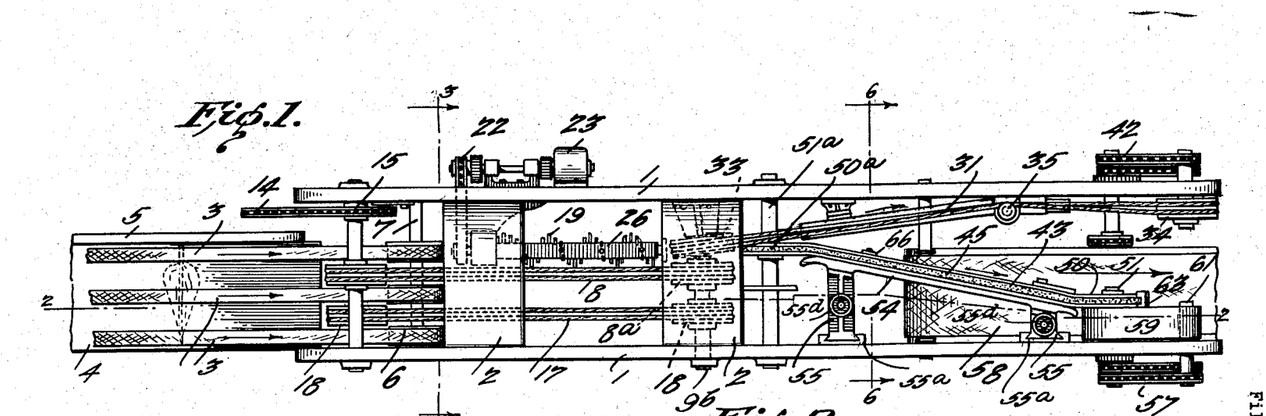
Fig. 1 is a top plan view of the machine of the present invention.

The butt cleaning mechanism, as more clearly shown in Figs. 1 and 2, is arranged adjacent the path of movement of the butt ends of the leaves as they are advanced by the cables 8 and 9. Any appropriate construction of butt-cleaning mechanism may be employed, but I have obtained exceptionally good results with the mechanism herein shown, which, as more clearly illustrated in Figs. 1, 2, 3, 4 and 5, comprise two opposed sets of wire fingers 19 mounted for rotation in opposite directions upon upper and lower rotary shafts 20 and 21, which shafts are driven by sprocket gearing 22, from a motor 23, as more clearly shown in Figs. 1 and 3. Obviously, the shafts 20 and 21 may be driven from any suitable source of power, that shown being merely by way of illustration.

The two sets of wire fingers 19,—of which there are an appropriate number in each set,—are so mounted on their respective shafts, 20 and 21, as to define a spiral line to successively attack and advance the stem butts as they travel within the range of action of the fingers. Since the fingers are made of wire, and are therefore, somewhat yieldable, they operate to brush or wipe the lamina from the stem butts without unduly cutting the same into small fragments, but they nevertheless clean the stem-butts, the removed lamina dropping into a funnel-shaped hopper 24, as more clearly shown in Fig. 2, and conveyed through pipe 25 to a suitable receptacle located either at the machine or on the floor below the room in which the machine is located.

The fingers 19 may be mounted upon their respective shafts in any suitable way, but I prefer to mount each finger in a separate disk 26, as more clearly shown in Figs. 4 and 5, the disks being arranged alongside each other on their shafts and each having a transverse bore 27, extending inwardly from its periphery to receive the end of the finger, which is then securely held in place by means of a set screw 28 passing through the wall 29 of a cutout portion formed in the periphery of the disk, as more clearly shown in Fig. 4. In order to allow some freedom of movement of the fingers 19 adjacent the point where they are attached to the disks, I provide each disk with a counter-bore 30 located directly above the bore 27. The purpose of this counter-bore 30 is to permit the finger 19 to yield slightly when it engages the leaf-stem, and thus prevent it from being unduly bent through continued operation.

Figure 16:
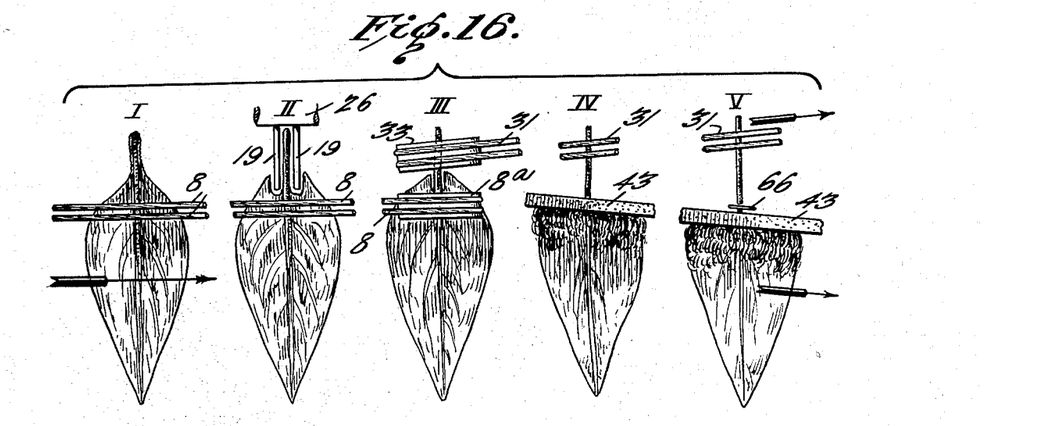
Fig. 16 is a diagrammatic view illustrating several of the successive stages through which the leaves pass during the feeding and stemming operations.
Figure 17:
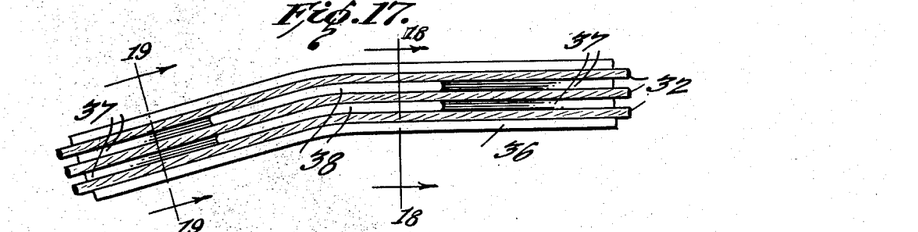
Fig. 17 is a top plan view showing a portion of the guide for the stem-gripping cables.
Figure 18:
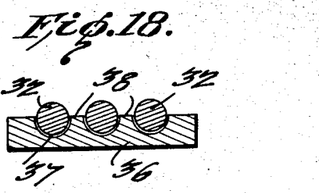
Fig. 18 is a transverse section on the line 18—18 of Fig. 17.

The two sets of fingers which, as stated, are arranged spirally on their shafts, operate in the direction of the arrows illustrated in Fig. 3, and serve to successively act upon the stem-butts as they pass through the range of action of the fingers to brush or wipe the membranes therefrom, and by referring to stage II, Fig. 16, it will be seen that the fingers acting upon opposed sides of the stem-butts clean the same without thrashing the membranes therefrom, but leaving portions of the leaf adjacent the butt projecting somewhat as shown diagrammatically in stages II and III of Fig. 16.

From the butt-cleaning mechanism, the leaves are advanced sidewise through the range of action of the stemming mechanism presently to be described. The means for carrying the leaves through the range of action of the stemming mechanism comprises another set of upper and lower endless cables 31 and 32, which are trained over the grooved idlers 33 and grooved pulleys 34. These upper and lower endless cables 31 and 32 are constructed and arranged to operate like the cables 8 and 9, except that they are arranged to grip the stem-butts only, and that they diverge outwardly at the point where they grip the butts as the leaves are successively released from between the cables 8 and 9.

As the cables 31 and 32 travel at a greater speed than the cables 8 and 9, it will be seen that the leaves are spaced and separated one from the other so that when they pass through the stemming mechanism, there will be less likelihood of congestion or clogging. This, I have also discovered through continued operation of the machine, lessens the tendency of the stemming mechanism to unduly tear the leaves, leaving the stripped portions in large leaf sections.

As will be seen by referring to Fig. 1, the path of movement of the cables 31 and 32 at the point where they receive the leaves from the cables 8 and 9, diverge outwardly and they are trained over guide pulleys 35 and from that point move onward in a straight line to the point where they engage the grooved driven pulleys 34. In order to properly maintain the two sets of cables 31 and 32 in parallel relation, and especially at or adjacent the point where they approach the turn or bend at the guide-pulleys 35, I provide upper and lower guide-plates 36, as more clearly shown in Figs. 17 to 20, the said plates being formed with spaced cable channels 37 separated by longitudinal ribs 38. As more clearly shown in Fig. 19 the butt of the leaf stem 40 at the point where it is gripped between the cables 31 and 32, is bent, crimped or creased transversely, and thus securely held between the cables, irrespective of the diameter of the stems of adjacent leaves, so that they will not yield or become detached from between the cables by pulling strains exerted thereon during the operation of the stemming mechanism.

Figure 9:
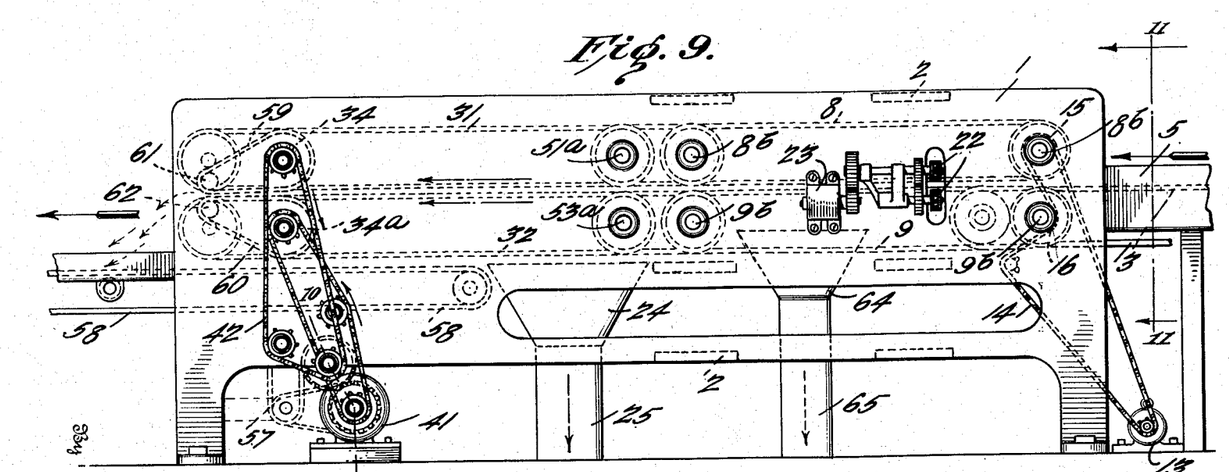
Fig. 9 is a side elevation of the machine looking from the feed end toward the delivery end.
Figure 10:
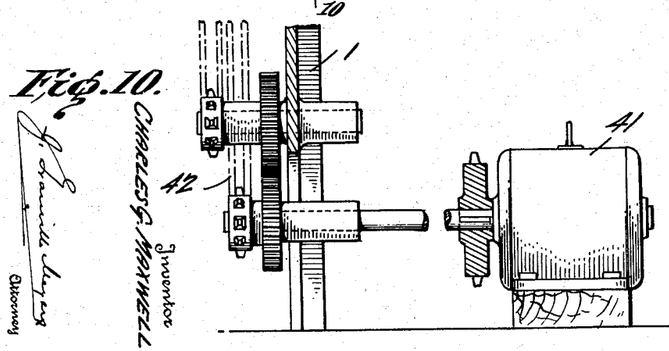
Fig. 10 is an enlarged detail view of the motor and gearing for driving the endless stemming mechanism.
Figure 11:
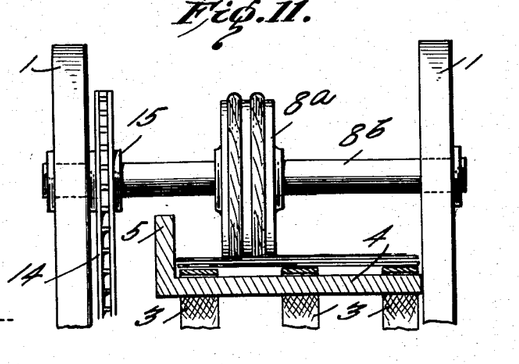
Fig. 11 is a transverse section taken on the line 11—11 of Fig. 9.

The driven pulleys 34 and 34ª, which support the cables 31 and 32, may be driven from any suitable source of power, such for instance, from the motor 41, through the chain and sprocket mechanism 42, illustrated in Figs. 9, and 10. Obviously any other suitable driving mechanism may be employed without departing from the spirit of the invention.

Figure 12:
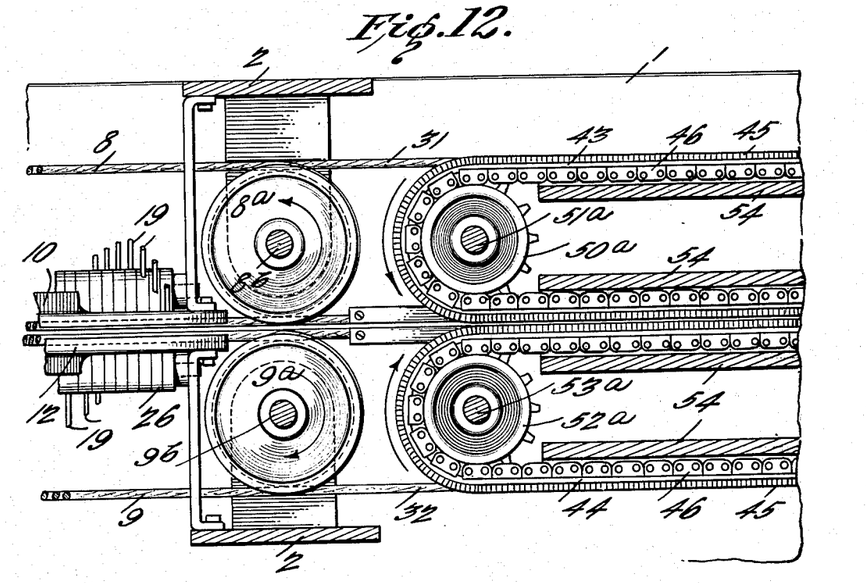
Fig. 12 is a vertical longitudinal section on an enlarged scale showing portions of the buttcleaning mechanism, the stem-gripping cables, and the stemming mechanism.
Figures 13, 14, 15:
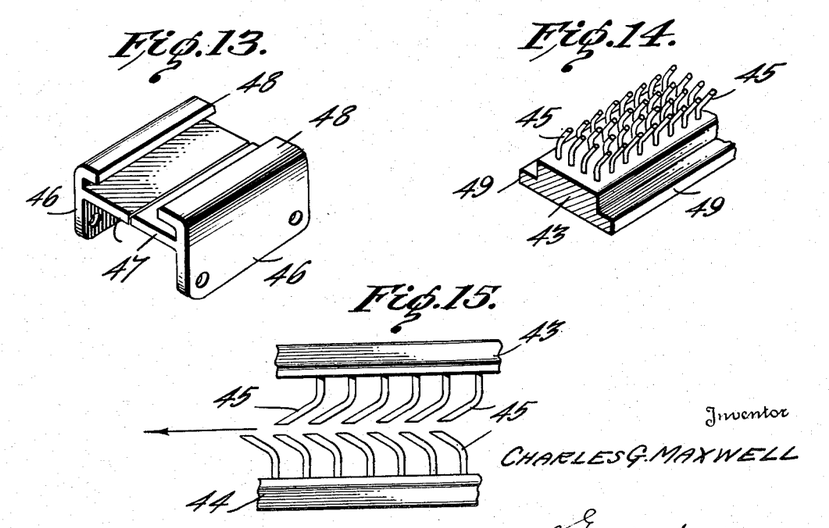
Fig. 13 is a perspective view of one form of chain link for carrying the endless card-clothing strip or belt.
Fig. 14 is a perspective view of a portion of the card-clothing strip or belt.
Fig. 15 is a side elevation of portions of opposed card-clothing strips or belts constituting the stemming elements.

The stemming mechanism comprises, in the instance shown, oppositely disposed upper and lower endless belts 43 and 44, as more clearly shown in Figs. 2, 6 and 12, which belts are provided on their outer or exposed face with leaf-engaging means shown in the present instance as consisting of carding teeth or wires 45, as more clearly illustrated in Figs. 14 and 15, the extremities of the teeth being bent laterally in the direction of travel of the belts as shown.

The endless belts 43, and 44, are preferably formed of suitable flexible material such as leather, canvas or composition material and are freely and removably supported upon endless chains consisting of pivotally connected links 46, such as shown in Fig. 13, each link consisting of a pair of opposed members 46, having a base wall 47, and an inwardly directed flange 48, to provide an undercut groove to receive and support the belts 43 and 44, which have lateral reduced portions 49, along their longitudinal edges which fit loosely under the chain-link flanges 48, so that the endless belts may have a traveling movement independent of the movement of the endless chains, as will presently appear.

As will be seen by referring to Figs. 2 and 12, there are two sets of endless chain-links 46, and their associated endless stripper belts 43 and 44, and these are arranged to bring two of their adjacent parallel runs in opposed relation to provide between them a relatively long narrow slot or stemming zone bounded above and below by the carding teeth 45, and between which the leaf-stems are pulled while the carding teeth or other surfaces serve to hold back the leaf membrane to effect the stripping operation as the leaves are advanced by the endless belts with their butt-ends gripped and carried forward at the same speed by the gripper cables 31 and 32. As the free ends of the carding teeth are bent as described they do not puncture and tear the leaf, but merely form an obstruction which serves to wipe the leaf membrane from the stem as the latter is withdrawn therefrom during its advance. Inasmuch as the teeth of one belt do not inter-engage or overlap those of its opposed, or companion belt, they do not exert any appreciable additional pressure upon the stems of the leaves, as distinguished from the leaf membrane, such as would add increased resistance to the pulling action of the stem-butt traction members, and this lessens the tendency to break the stems. As the teeth of the stripping belts are subject to wear and must be renewed from time to time, I prefer to provide a chain link supporting structure such as that shown in Fig. 13, which will permit removal and replacement of the stripper belts 43 when required.

The upper endless chain of links 46 is mounted to travel over the sprocket wheels 50 and 50ª, mounted upon shafts 51 and 51ª, while the lower endless chain of links is mounted upon the sprockets 52 and 52ª, mounted upon shafts 53 and 53ª, and the runs of both chains travel over and under upper and lower guide plates 54 supported upon brackets 55, bolted or otherwise secured to one of the side members 1, said plates serving to maintain the runs of the chains in parallelism, as more clearly shown in Fig. 6. I prefer to mount the guide plate 54 of the upper chain so that its lower run with its associated stripper belt, may be adjusted vertically toward and from the upper run of the lower chain in order to vary the width of the slot between the two adjacent card-clothing facings to effect proper stemming.

In Figs. 1 and 6 I have shown one way in which the adjustment referred to may be accomplished. In the instance illustrated I mount one end of each of the stripper-chain carrying brackets 55 in a dove-tailed guide 55ª secured to one of the side walls 1 of the main frame-member. Each bracket 55 carries a centrally-arranged threaded nut 55ᵇ through which extends a threaded shaft 55ᶜ. The upper end of each threaded shaft carries a hand-wheel 55ᵈ, and the lower end of each shaft is mounted for rotation in a suitable bearing carried by a bracket 55ᵉ, which bracket is attached at one end to the said frame member 1. By this arrangement it will be seen that upon turning the threaded shafts 55ᶜ in one direction or the other the entire upper endless stripping mechanism may be adjusted vertically toward or from the upper run of the lower endless stripping mechanism so that the space or slot between the adjacent parallel runs of the two endless stripper mechanisms may be varied as to width to accommodate leaves of different sizes or thickness.

I consider this to be an important feature of my invention. Obviously, some other form of mechanism may be employed for effecting the adjustment of the two endless stripper mechanisms relative to each other without departing from the spirit of the invention.

The shafts 50ª and 53ª are so arranged with relation to the pulleys 8ᵇ and 9ᵇ, which support the feed cables 8 and 9, that the cleaned portions of the stems of the oncoming leaves will be fed between the adjacent runs of the endless stemming belts, with the membranous portions of the leaves lying wholly to one side, namely, the right-hand side in Fig. 1, of the diverging runs of the belts so that as the leaves are continuously advanced by the gripper cables 31 and 32 and the endless belts 43 and 44, (because of the diverging arrangement of these two advancing mechanisms) the stems will be pulled from their leaves as the membranes or laminæ are held back by the endless stemming belts.

By referring to Fig. 1, it will be seen that the endless stemming belts, at the point where they receive the leaves from the endless cables 8 and 9, travel for a short distance in a direction parallel to the path of travel of the belts 8 and 9, and from that point on they travel in a diverging path, and toward the end of the travel path and at the point where they travel over the pulley 53, they again move for a short distance in a path parallel to the path of movement of the cables 8 and 9. While I prefer to employ this arrangement in order that the supporting sprockets for the endless chains may be mounted upon straight transverse shafts, I do not wish to limit myself to this exact arrangement, as obviously the chain-supporting sprockets may be otherwise supported without departing from the spirit of the invention.

As heretofore stated, the endless stemming belts and their supporting chains are driven at a speed substantially the same as the speed of travel of the butt-gripping cables, 31 and 32, in order that the gripped stem-butts and the remainder of the leaves at the stripping points will be maintained substantially straight during the stripping operation. The speed of travel of the leaves during stripping or stemming is, as stated, considerably greater than the speed of travel of the cables, 8 and 9, which deliver the leaves to the stemming mechanism.

The shafts 51 and 53 upon which the sprockets 50 and 52 are mounted, may be driven from any suitable source of power. In the present instance I have shown this source of power as consisting of an electric motor 56 having a sprocket chain drive 57 leading to sprocket wheel 52, which latter is geared to shaft 51 as shown.

An endless belt 58 of sufficient width is located below the path of movement of the endless stripper mechanism, as more clearly shown in Figs. 1 and 2, which serves to receive the stripped portions of the leaves and carry them out of the machine as they are stripped from their stems by the stemming mechanism. In order to carry away such leaf portions which may travel to the far end of the endless stripper belts, I provide a pair of opposed endless canvas or other belts, 59 and 60, which are mounted upon pulleys carried by the shafts 51 and 53, and by other pulleys carried by additional shafts 61 and 62, the adjacent parallel runs of the belts 59 and 60, lying in the same plane as the adjacent parallel runs of the stripper belts 43 and 44, all as more clearly shown in Figs. 1 and 2.

I may also provide, if found necessary, any suitable form of cleaning device, such as the flexible leather strip shown at 63 (Fig. 1) for engaging and cleaning the card-clothing faces of the stripper belts 42 and 43 of clinging leaves or leaf portions, one such device being arranged in association with each of said belts.

It sometimes happens that leaves with broken stems are carried into the machine by the feed cables 8 and 9, and as the stems of such leaves will not ordinarily survive pulling strains, but will break and fall immediately they are engaged by the stripping mechanism, I have provided a hopper 64 below the entrance end of the stemming belts to receive such leaves, the hopper being provided with a chute 65 to conduct the leaves to a suitable point where they may be collected and subsequently stemmed.

As the smaller portion of the stem of each leaf, that is the portion adjacent the tip, is capable of utilization for all purposes in which the leaf is used, I have provided a means for dividing or weakening the stem at a selected point in its length, so that it will be divided at said point in order that such portion of the stem will be retained with the leaf. This dividing or weakening means in the instance shown, consists of an adjustable knife blade 66 (see Figs. 7 and 8), which blade is mounted upon, or formed as a part of a stem 67, secured by any suitable means, as by a screw 68 to a block 69, mounted to be moved and set to adjusted position in a groove or way 70 formed along the edge of one of the plates 54 upon which the endless chain links travel. Obviously, the knife 66 may be adjusted or set at any desired point along the path of movement of the leaves as they pass through the stemming mechanism so as to leave a greater or less amount of stem in the leaf. The knife may be adjusted, attached and supported to the plate 54 otherwise than by the screw 68 and the block 69, movable in the channel 70, without departing from the spirit of the invention.

Figures 19, 21:
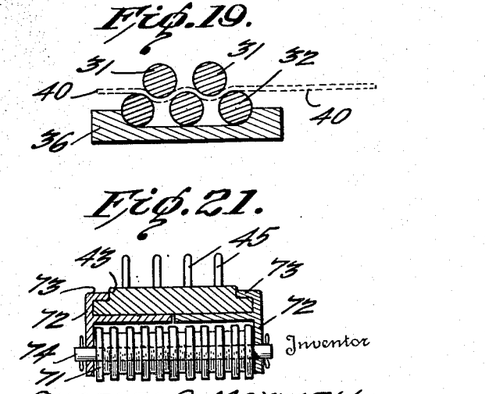
Fig. 19 is a transverse section on the line 19—19 of Fig. 17.
Fig. 21 is a transverse section showing a slightly modified form of chain link for supporting and carrying the endless-card clothing stemming belt.
Figure 20:
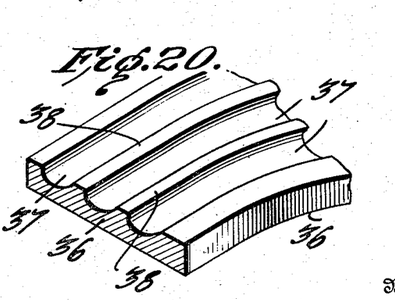
Fig. 20 is a perspective view of a portion of the stem-gripping cable guide.

In Fig. 21 I have shown a modified form of chain link to support the endless stripper belt 43. In this construction the chain proper is made up of a plurality of spaced links 71 of usual construction, and the means for engaging and holding the longitudinal edges of the stripper belts 43, in this instance consists of plates 71 having lateral flanges 72, which overhang the reduced longitudinal edges of the belts 43, the plates 71 being provided with suitable openings through which the connecting pins 74 of the links 71 may pass. By this arrangement the flanged plates 72 may be attached to a known form of chain link at small cost and thus obviate the necessity for constructing special links for the purpose.

The operation of the machine will be clear from the foregoing detailed description and without further elaboration, suffice it to say that the construction and arrangement of its various parts are such that the machine will have an unusually long life without requiring major repairs or replacements and is capable of a much greater daily output or production than any other stemming machine known to me. Both of these features are of prime importance because they tend materially to reduce the cost of the stemming operation.

I do not wish to be understood as limiting myself to a machine having in combination all the features herein shown and described as obviously some of them may be dispensed with while others may be employed in association with other mechanisms without departing from the spirit of the invention.

What is claimed as new is:

1. In a tobacco stemming machine, two sets of opposed endless stemming devices having spaced apart parallel runs travelling in a rectilinear path, and means for advancing a succession of leaves between the said stemming devices, comprising two sets of opposed cooperating endless metal cables mounted to provide opposed parallel runs, the cables of the two sets being offset relative to each other to grip and flex or crimp the leaf stems transversely at adjacent points, said stemming devices and endless cables being arranged to travel in diverging paths.

2. In a tobacco stemming machine, two sets of opposed endless stemming devices having spaced apart parallel runs travelling in a rectilinear path, and means for advancing a succession of leaves between the said stemming devices, comprising two sets of co-operating endless metal cables mounted to provide opposed parallel runs, the cables of the two sets being offset relative to each other to grip and flex or crimp the leaf stems transversely at adjacent points, said stemming devices and endless cables being arranged to travel in diverging paths, and means for driving the stemming devices and gripping cables at substantially the same speed.

3. In a tobacco stemming machine, means for horizontally supporting and advancing a succession of leaves in a rectilinear path, stemming mechanism including a pair of co-operating endless belts mounted to provide opposed parallel runs, with their adjacent faces normally spaced from each other and forming between them a stemming zone, said endless belts being arranged to travel in a rectilinear path divergent to the path of travel of the advancing means, and means for moving the advancing means and the belts at substantially the same speed.

4. In a tobacco stemming machine, means for horizontally supporting and advancing a succession of leaves sidewise, stemming mechanism comprising a pair of endless chains mounted to provide opposed parallel runs, an independently movable endless belt provided with stemming means carried by each endless chain, and means for moving the advancing means and the endless stemming belts at substantially the same speed.

5. In a tobacco stemming machine, leaf-stemming mechanism including a pair of opposed endless chains arranged to provide parallel runs, an endless stemming belt removably carried by each chain and having independent movement relative thereto, means for gripping the stem butts and advancing the leaves between the parallel runs of said stemming mechanism, said advancing means and stemming mechanism being arranged to travel in diverging rectilinear paths, and means for moving them at substantially the same speed.

6. A tobacco stemming machine, including co-operating opposed endless means for gripping leaves transversely and for forwarding them, means associated with said means for removing the adhering leaf membrane from the stem-butts, opposed endless metal cables located in advance of the said forwarding means positioned to grip and flex or crimp the said stem-butts transversely and carry the leaves forward, and opposed endless stemming means arranged adjacent the path of movement of the said cables but divergent thereto and between which cleaned portions of the leaf-stems pass during their advance said cables serving to pull the stems from the leaves while the membranes are held back by the stemming means, said cables and stemming means each having parallel runs travelling in a rectilinear path.

7. In a tobacco stemming machine, stem-butt stripping means comprising opposed sets of spirally-arranged flexible rotary fingers, a mounting to which an end of each finger is attached, said mounting having a counter bore constructed to permit lateral play of the finger adjacent its point of attachment to the mounting.

8. In a tobacco stemming machine, stemming mechanism including a pair of opposed endless chains each comprising pivotally connected links arranged to provide parallel runs, an endless belt of flexible material mounted for movement upon each chain, and means carried by the chain links for preventing lateral displacement of its associated belt.

9. A tobacco stemming machine, including endless stripping means having opposed parallel runs, endless stem-butt gripping mechanism for advancing a succession of leaves between the said opposed runs, said stripping means having the major portion of its active runs guided for movement in a direction diverging from the line of movement of the gripping and advancing mechanism, and a portion guided for movement in a straight line, and means for driving the stemming means and the advancing mechanism at substantially the same speed.

10. A tobacco stemming machine including endless stripping means having opposed parallel runs, endless stem-gripping cables for advancing a succession of leaves between the said opposed runs, said stripping means and advancing cables having portions of their runs guided for movement in diverging directions and other portions guided for parallel movement, and means for driving the stripping means and the cables at substantially the same speed.

11. A tobacco stemming machine including a pair of endless stripper mechanisms providing opposed cooperating parallel runs, means for moving one of said mechanisms bodily toward and from the other to vary the width of the space between said runs, means for advancing a succession of leaves between said runs and means for pulling the stems from the leaves during such advance.

12. A tobacco stemming machine including co-operating endless stripping means having opposed parallel runs travelling in a rectilinear path and forming between them a stemming zone, co-operating endless traction members having opposed convex stem-butt gripping portions adapted to grip and flex the stem-butts transversely, said traction members travelling in a rectilinear path alongside the stripping means and acting conjointly therewith to advance a succession of leaves thru said stemming zone, said stripping means and traction members travelling in relatively diverging paths, and means for advancing the stripping means and traction members at substantially the same speed whereby the stems are progressively withdrawn from their leaves and from between the stripping means during such advance.

13. A tobacco stemming machine including co-operating endless stripping belts having opposed normally-separated parallel runs travelling in a rectilinear path and forming between them a stemming zone, co-operating endless traction members having opposed convex stem-butt gripping portions adapted to grip and flex the stem butts transversely, said traction members travelling in a rectilinear path alongside the stripping belts and acting conjointly therewith to advance a succession of leaves thru said stemming zone, said stripping belts and traction members moving in relatively diverging paths, and means for advancing the belts and traction members at substantially the same speed whereby the stems are progressively withdrawn from their leaves and from between the stripping belts during such advance.

14. A tobacco stemming machine including co-operating endless stripping means having opposed parallel runs travelling in a rectilinear path and forming between them a stemming zone, co-operating endless stem-butt gripping cables each formed of wire strands and having opposed convex portions adapted to grip and flex the stem-butts transversely, said cables travelling in a rectilinear path alongside the stripping belts and acting conjointly therewith to advance a succession of leaves thru said stemming zone, said stripping belts and gripping cables moving in relatively diverging paths, and means for advancing the leaves and cables at substantially the same speed whereby the stems are progressively withdrawn from their leaves and from between the stripping belts during such advance.

15. A tobacco stemming machine including co-operating endless chain links having opposed parallel runs travelling in a rectilinear path, endless stripping belts removably supported for independent movement on said chain links and forming between them a stemming zone, co-operating endless stem-butt gripping means having portions adapted to grip and flex the stem butts transversely, said gripping means travelling in a rectilinear path alongside the stripping belts and acting conjointly therewith to advance a succession of leaves through said stemming zone, said stripping belts and gripping means travelling in relatively diverging paths, and means for advancing the belts and gripping means at substantially the same speed whereby the stems are progressively withdrawn from their leaves and from between the stripping belts during such advance.

16. A tobacco stemming machine including co-operating endless stripping means having opposed parallel runs travelling in a rectilinear path and forming between them a stemming zone, co-operating endless traction members having opposed convex stem-butt gripping portions adapted to grip and flex the stem-butts transversely, said traction members travelling in a rectilinear path alongside the stripping means and acting conjointly therewith to advance a succession of leaves thru said stemming zone, said stripping belts and traction members travelling in relatively diverging paths, means for guiding the traction members and for maintaining the convex portions thereof into gripping contact with the stem-butts, and means for advancing the stripping means and traction members at substantially the same speed whereby the stems are progressively withdrawn from their leaves and from between the stripping means during such advance.

17. In a tobacco stemming machine, means for advancing the leaves thru the machine, comprising upper and lower endless traction members each mounted to provide a plurality of opposed co-operating parallel runs travelling in a rectilinear path, the confronting faces of said members each having a plurality of laterally-off-set convex portions with the convex portions of the upper member position to travel between the convex portions of the lower member and operating to grip and flex the butts of the stems transversely at adjacent points in the length of the butts.

18. In a tobacco stemming machine, means for advancing the leaves thru the machine, comprising upper and lower endless traction members mounted to provide co-operating parallel runs travelling in a rectilinear path, the confronting faces of said members each comprising a plurality of spaced apart convex portions with the convex portions of the upper member positioned to travel between the convex portions of the lower member and operating to grip and flex the butts of the stems transversely at adjacent points in the length of the butts, and means for guiding the traction members and for maintaining the said convex portions thereof in gripping contact with the stem-butts.

19. In a tobacco stemming machine, means for advancing the leaves thru the machine comprising two opposed sets of flexible endless metal cables each composed of twisted wire strands, mounted to provide co-operating parallel runs travelling in a rectilinear path, the confronting faces of the cables of one set being positioned to travel in the spaces between the faces of the other set, whereby the butts of the leaves entering between the two sets of cables will be gripped and flexed transversely at adjacent points in the length of the butts.

20. In a tobacco stemming machine, means for advancing the leaves thru the machine, comprising two opposed sets of endless metal cables mounted to provide opposed co-operating parallel runs travelling in a rectilinear path, the confronting faces of the cables of one set being positioned to travel in the spaces between the faces of the other set, whereby the butts of the leaves entering between the two sets of cables will be gripped and flexed transversely at adjacent points in the length of the butts, and means for guiding the cables and for maintaining the said confronting faces thereof in gripping contact with the stem-butts.

21. A tobacco stemming machine including a plurality of successively acting means for supporting and advancing a succession of leaves through the machine, each of such means travelling at a progressively-increased speed so that the advancing leaves will be separated from each other as they travel from one such means to the next succeeding means, endless stripping means arranged alongside the advancing means having the greatest speed, said stripping means including co-operating endless belts having opposed parallel runs travelling in a rectilinear path and forming between them a stemming zone, the advancing means of greatest speed comprising endless traction members having opposed convex portions travelling in a rectilinear path adapted to grip and flex the stem-butts transversely, said traction members acting conjointly with the stemming means to advance a succession of leaves thru the stemming zone, the stemming means and traction members travelling in relatively diverging paths, and means for advancing the stemming means and traction members at substantially the same speed, whereby the stems are progressively withdrawn from their leaves and from between the stemming means during such advance.

22. In a tobacco stemming machine, means for advancing the leaves, comprising two opposed sets of endless metal cables mounted to provide co-operating parallel runs travelling in a rectilinear path with the runs of the cables of one set positioned for travel in paths between the runs of adjacent cables of the opposite set, and the active faces of the two sets being arranged to engage and flex the leaves transversely at closely adjacent points in the length of the leaves.

23. In a tobacco stemming machine, means for advancing leaves to be stemmed, comprising two opposed sets of co-operating endless metal cables mounted to provide parallel runs travelling in a rectilinear path, the active faces of the parallel runs of one set being positioned to travel in the spaces between the active faces of those of the other set whereby the active faces of the two sets co-operate to grip and flex the leaves transversely at adjacent points in the length of the leaves.

24. In a tobacco stemming machine, means for advancing a succession of leaves to be gripped, comprising two sets of opposed co-operating endless metal cables mounted to provide parallel runs travelling in a rectilinear path and between which the leaves may be fed sidewise, the active faces of the cables of the two sets being offset laterally relative to each other to cause the said faces of one set to travel in the spaces between those of the other set to engage and grip opposed faces of the leaves and flex them transversely at adjacent points in the length thereof.

25. In a tobacco stemming machine, means for advancing a succession of leaves sidewise, comprising two opposed sets of co-operating endless metal cables mounted to provide parallel runs travelling in a rectilinear path, with the runs of the cables of one set being positioned for travel in paths between the runs of adjacent cables of the other set and operating to engage and flex the leaves transversely at different points therebetween, and means for guiding the cable runs and maintaining them in substantially parallel relation.

26. In a tobacco stemming machine, stem-butt stripping means comprising opposed sets of radially arranged flexible fingers, the fingers of each set being mounted in a spiral path and the free ends of those of one set overlapping and travelling between those of the other set, and means for rotating the fingers of the two sets in opposite directions.

27. In a tobacco stemming machine, stem-butt stripping means comprising opposed sets of rotary fingers, the fingers of each set being yieldable and mounted in a longitudinally disposed spiral path with the ends of one set overlapping and travelling between those of the other set, and means for rotating the fingers of each set in opposite directions.

28. In a tobacco stemming machine, stemming mechanism including a pair of opposed endless chains, each comprising pivotally-connected links arranged to provide parallel runs travelling in a rectilinear path, an endless belt of flexible material mounted upon each endless chain and each belt having flexible teeth projecting from the upper face thereof, and means carried by the chain links for preventing lateral displacement of its associated belt.

29. In a tobacco stemming machine, stemming mechanism including a pair of opposed endless chains, each comprising pivotally-connected links arranged to provide parallel runs travelling in a rectilinear path, an endless belt of flexible material rotatably mounted upon each chain and each belt having flexible teeth projecting from the upper face thereof, and means for removably attaching each belt to its associated endless chain.

30. In a tobacco stemming machine, successively acting leaf supporting and advancing means for continuously advancing a succession of leaves horizontally sidewise into and through the machine, each successive advancing means moving at an increased speed whereby the leaves are separated as they are fed from one advancing means to the next succeeding means, and endless stemming mechanism arranged adjacent to and travelling at substantially the same speed as the last advancing means, said stemming means and last named advancing means moving in relatively diverging rectilinear paths and at a speed of approximately two hundred feet per minute.

31. In a tobacco stemming machine, including endless stripping means having opposed parallel runs travelling in a rectilinear path, endless stem-butt gripping means for advancing a succession of leaves between the opposed runs, said stripping means being guided for movement in a direction divergent to each of the advancing means, and a separate pair of opposed endless belts, each having an end portion thereof moving about the axis of a delivery end of one of the endless stripping means, with the opposed runs of the said belts positioned for travel in a horizontal plane with portions extending beyond the endless stripping means and adapted to receive and carry away the leaves as they are delivered from between the endless stripping means.

32. In a tobacco stripping machine, including endless stripping means having opposed parallel runs travelling in a rectilinear path, separate means for advancing the leaves sidewise between the opposed runs of the endless stripping means, and a separate pair of endless belts having opposed parallel runs travelling in a horizontal plane, said belts located at the delivery end of the endless stripping means and each having an end portion thereof moving about the axis of a delivery end of one of the endless stripping means for receiving between them and for carrying away the leaves as they are delivered by the endless stripping means.

CHARLES G. MAXWELL.